United States Patent
Knight

(10) Patent No.: US 10,703,484 B2
(45) Date of Patent: Jul. 7, 2020

(54) AIRCRAFT SEAT ASSEMBLY INCLUDING A VIBRATION MITIGATING APPARATUS AND METHOD FOR FABRICATING THE SAME

(71) Applicant: Gulfstream Aerospace Corporation, Savannah, GA (US)

(72) Inventor: Michael Knight, Savannah, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 0 days.

(21) Appl. No.: 16/195,419

(22) Filed: Nov. 19, 2018

(65) Prior Publication Data

US 2020/0156795 A1 May 21, 2020

(51) Int. Cl.
| | |
|---|---|
| A47C 3/02 | (2006.01) |
| B64D 11/06 | (2006.01) |
| F16F 15/04 | (2006.01) |
| G10K 11/178 | (2006.01) |
| F16F 15/00 | (2006.01) |
| F16F 15/023 | (2006.01) |

(52) U.S. Cl.
CPC ...... *B64D 11/0619* (2014.12); *B64D 11/0639* (2014.12); *B64D 11/0696* (2013.01); *F16F 15/005* (2013.01); *F16F 15/023* (2013.01); *F16F 15/04* (2013.01); *G10K 11/178* (2013.01); *G10K 2210/3044* (2013.01); *G10K 2210/3211* (2013.01)

(58) Field of Classification Search
CPC .... B60N 2/42736; B60N 2/427; B60N 2/546; B60N 2/42709; B60N 2/50; B60N 2/504; B60N 2/509; B60N 2/502; F41H 7/046
USPC ........ 297/216.13, 216.1, 216.16; 244/122 R; 188/377, 371
See application file for complete search history.

(56) References Cited

U.S. PATENT DOCUMENTS

| | | | | |
|---|---|---|---|---|
| 4,128,217 A | * | 12/1978 | Mazelsky | B64D 25/04 188/377 |
| 5,221,071 A | * | 6/1993 | Hill | B60N 2/502 248/582 |
| 6,672,667 B1 | * | 1/2004 | Park | B60N 2/42754 297/216.1 |
| 7,152,842 B1 | * | 12/2006 | Monson | B63B 17/0081 248/678 |
| 7,472,935 B2 | * | 1/2009 | Love | B60N 2/42745 188/266.2 |
| 10,315,774 B2 | * | 6/2019 | Crozat | B64D 11/0619 |
| 2010/0230989 A1 | * | 9/2010 | Cantor | B60N 2/24 296/68.1 |

(Continued)

OTHER PUBLICATIONS

Amzar Azizan, et al., The Influence of Vibration on Seated Human Drowsiness, Article, Industrial Health 2016, 54, 296-307, Jan. 30, 2016.

*Primary Examiner* — Chi Q Nguyen
(74) *Attorney, Agent, or Firm* — LKGlobal | Lorenz & Kopf, LLP

(57) ABSTRACT

An aircraft seat assembly for supporting a seat occupant, and a method for fabricating an aircraft seat assembly for supporting a seat occupant are provided. In one non-limiting example, the aircraft seat assembly includes a seat structure and a seat cushion that is supported by the seat structure. A vibration mitigating apparatus is operatively coupled to the seat structure to prevent or reduce vibrations from transferring to the seat occupant.

15 Claims, 6 Drawing Sheets

(56) References Cited

U.S. PATENT DOCUMENTS

| | | | | |
|---|---|---|---|---|
| 2011/0024958 | A1* | 2/2011 | Deml | B60N 2/502 |
| | | | | 267/131 |
| 2012/0090930 | A1* | 4/2012 | Haller | B60N 2/502 |
| | | | | 188/280 |
| 2014/0216242 | A1* | 8/2014 | Lamparter | B60N 2/502 |
| | | | | 89/36.08 |
| 2015/0158401 | A1* | 6/2015 | Keller | B60N 2/24 |
| | | | | 297/216.19 |
| 2015/0300785 | A1* | 10/2015 | Lamparter | F41H 7/046 |
| | | | | 297/216.17 |

* cited by examiner

AIRCRAFT SEAT ASSEMBLY INCLUDING A VIBRATION MITIGATING APPARATUS AND METHOD FOR FABRICATING THE SAME

TECHNICAL FIELD

The technical field relates generally to seat assemblies for aircrafts, and more particularly, relates to aircraft seat assemblies including a vibration mitigating apparatus, and methods for fabricating such seat assemblies.

BACKGROUND

The commercial and/or military aircraft industries often include seat assemblies in the aircraft for transporting crewmembers, passengers, and/or other occupants. The aircraft seat assemblies include, for example, a seat frame that supports a plurality of seat cushions, such as a seat base cushion and a seat backrest cushion, for providing seating for an occupant.

Some seat assemblies, for example, for crewmembers that may be located on the flight deck, are typically relatively light and often lack a lot of creature comforts that may otherwise be incorporated into seat assemblies for passengers. Additionally, such seat assemblies include a relatively rigid structural frame that may be rigidly attached to the aircraft structure. As such, any vibrations, for example vibrations normally encountered during the operation of the vehicle, can easily transfer from the aircraft structure through the structural seat frame to the seat occupant. Sometimes these vibrations are at a frequency and amplitude that are conducive for inducing drowsiness.

During trips, particularly long-range flights or the like, it can become challenging for crewmembers or other occupants who wish to remain fully awake and alert to not become drowsy and fall asleep. Unfortunately, if a crewmember or other occupant is exposed to vibrations particularly at a frequency and amplitude that is conducive for inducing drowsiness, remaining fully awake and alert for an extended time can be difficult.

Accordingly, it is desirable to provide improved aircraft seat assemblies that can help seat occupants to remain fully awake and alert, and methods for fabricating such aircraft seat assemblies. Furthermore, other desirable features and characteristics of the various embodiments described herein will become apparent from the subsequent detailed description and the appended claims, taken in conjunction with the accompanying drawings and this background.

SUMMARY

Various non-limiting embodiments of an aircraft seat assembly for supporting a seat occupant, and various non-limiting embodiments of a method for fabricating an aircraft seat assembly for supporting a seat occupant, are provided herein.

In a first non-limiting embodiment, the aircraft seat assembly includes, but is not limited to, a seat structure. The aircraft seat assembly further includes, but is not limited to, a seat cushion supported by the seat structure. The aircraft seat assembly further includes, but is not limited to, a vibration mitigating apparatus that is operatively coupled to the seat structure to prevent or reduce vibrations from transferring to the seat occupant.

In another non-limiting embodiment, the aircraft seat assembly includes, but is not limited to, a seat base portion that includes a seat base structure portion and a seat base cushion supported by the seat base structure portion. The aircraft seat assembly further includes, but is not limited to, a seat backrest portion that is coupled to the seat base portion. The seat backrest portion is configured to extend substantially upright from the seat base portion. The seat backrest portion includes a seat backrest structure portion and a seat backrest cushion supported by the seat backrest structure portion. The aircraft seat assembly further includes, but is not limited to, a vibration mitigating apparatus that is operatively coupled to one of the seat base structure portion and the seat backrest structure portion to reduce or prevent vibrations from transferring to the seat occupant.

In another non-limiting embodiment, the method includes, but is not limited to, the step of supporting a seat cushion with a seat structure. The method further includes, but is not limited to, the step of operatively coupling a vibration mitigating apparatus to the seat structure to one of reduce and prevent vibrations from transferring to the seat occupant.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to aircraft seat assemblies and methods for fabricating aircraft seat assemblies for an aircraft. The exemplary embodiments taught herein provide an aircraft seat assembly that includes a seat structure and a seat cushion that is supported by the seat structure. The aircraft seat assembly further includes a vibration mitigating apparatus that is operatively coupled to the seat structure to prevent or reduce vibrations from transferring to the seat occupant. In an exemplary embodiment, the vibrations are relatively low frequency vibrations that cause or otherwise are conducive for inducing drowsiness. By preventing or reducing such vibrations from transferring to the seat occupant, it is easier for the seat occupant to remain fully awake and alert without becoming drowsy and falling asleep.

Figure 1:
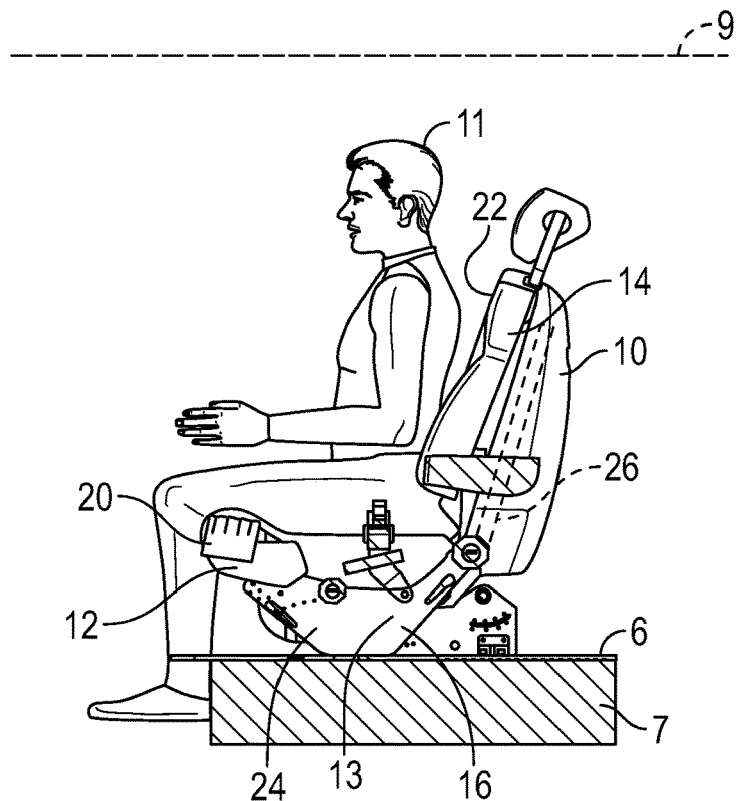
FIG. 1 illustrates a side view of an aircraft seat assembly supporting a seat occupant in accordance with an exemplary embodiment.

FIG. 1 illustrates a side view of an aircraft seat assembly 10 supporting a seat occupant 11 in an aircraft 9 in accordance with an exemplary embodiment. As illustrated, a lower portion of the aircraft seat assembly 10 is coupled to a seat track 6 that is supported on an airframe structure 7 of the aircraft 9.

The aircraft seat assembly 10 has a seat base portion 12 that includes a seat substructure 13, and a seat backrest portion 14 that extends substantially upright from the seat base portion 12. In one example, the seat backrest portion 14 is fixedly coupled to the seat base portion 12 such that the seat backrest portion 14 is permanently set in a substantially upright configuration. In another example, the aircraft seat assembly 10 is an adjustable aircraft seat assembly in which the seat backrest portion 14 is pivotably coupled to the seat base portion 12 for movement between a substantially upright position and, for example, a substantially reclined (e.g., rearward leaning) position.

As illustrated, the aircraft seat assembly 10 includes a seat frame 16 (also referred to herein as "seat structure") for supporting the aircraft seat assembly 10 including supporting a plurality of seat cushions 20 and 22. The seat frame 16 is formed of a relatively rigid support material such as metal, e.g., aluminum or the like, composite, or any other frame structure material(s) known to those skilled in the art.

The seat frame 16 includes a seat base structure portion 24 and a seat backrest structure portion 26 that is operatively coupled (e.g., fixedly coupled or pivotably coupled) to the seat base structure portion 24 to extend in a substantially upright position from the seat base structure portion 24. The seat base structure portion 24 of the seat frame 16 supports a seat base cushion 20 that together form at least part of the seat base portion 12 of the aircraft seat assembly 10. Likewise, the seat backrest structure portion 26 of the seat frame 16 supports a seat backrest cushion 22 that together form at least part of the seat backrest portion 14 of the aircraft seat assembly 10. Various other trim and/or shell panels or components may be directly or indirectly coupled to the seat frame 16 to form any remaining parts or sections of the seat base portion 12 and/or the seat backrest portion 14 of the aircraft seat assembly 10.

The seat base and backrest cushions 20 and 22 are each formed of relatively flexible and/or soft materials such as a foam material(s) that is covered or at least partially covered with an outer covering. The outer covering is a relatively flexible and/or soft skin material such as leather, cloth or textile fabric (e.g., woven or knitted construction), thermoplastic skin material such as TPO, PVC, or the like. The outer covering may be formed using a conventional leather forming process, a thermoforming process, a slush or rotational molding process, and/or any other conventional process for forming an interior trim outer skin covering that is relatively flexible and/or soft.

Figure 2:
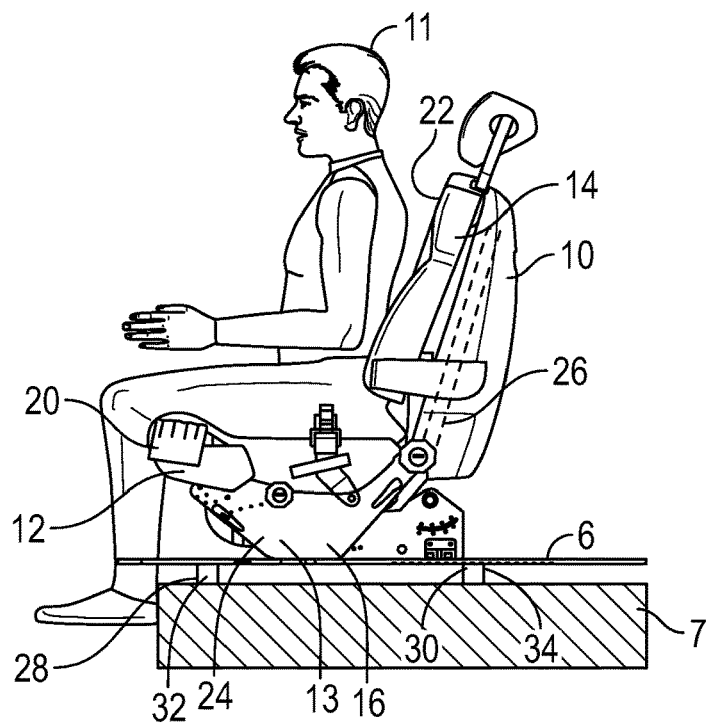
FIG. 2 illustrates a side view of an aircraft seat assembly including a vibration mitigating apparatus and a seat occupant in accordance with an exemplary embodiment.

Referring to FIG. 2, the aircraft seat assembly 10 includes one or more a vibration mitigating apparatuses 28 and 30 each configured to reduce and/or prevent vibrations that are conducive for inducing drowsiness from transferring to the seat occupant 11. Although the aircraft seat assembly 10 is illustrated as having two vibration mitigating apparatuses 28 and 30, it is to be understood that various embodiments may include a single vibration producing apparatus or alternatively, may include more than two vibration producing apparatuses.

In an exemplary embodiment, each of the vibration mitigating apparatuses 28 and 30 are configured to reduce and/or prevent relatively low frequency vibrations having a frequency of from about 1 to about 15 Hz, and an amplitude of from about 0.005 inches to about 1 inch for inducing drowsiness from transferring to the seat occupant 11. In an exemplary embodiment, the vibration mitigating apparatuses 28 and/or 30 are configured to produce relatively smooth, sinusoidal waveforms. In an alternative embodiment, the vibration mitigating apparatuses 28 and/or 30 are configured to produce triangular waveforms. As will be discussed in further detail below, in an exemplary embodiment, the vibration mitigating apparatuses 28 and 30, independently, can be a vibration isolator, an electromechanical actuator, a hydraulic actuator, a pneumatic actuator, a linear actuator, an audio speaker, or a shaker actuator.

The vibration mitigating apparatuses 28 and 30 are operatively coupled to seat frame 16 (e.g., seat structure). For example, the vibration mitigating apparatuses 28 and 30 may be indirectly coupled to the seat frame 16. As illustrated, in an exemplary embodiment, the vibration mitigating apparatuses 28 and 30 are vibration isolators 32 and 34 that are disposed between and directly coupled to the seat track 6 and the airframe structure 7. The vibration isolators 32 and 34 are passive devices that dampen or otherwise absorb vibrations to reduce or prevent vibrations propagating through the airframe structure 7 from transferring through the seat track 6 to the seat frame 16, thereby isolating the seat structure from the vibrations. Non-limiting examples of vibration isolators 32 and/or 34 are illustrated in FIGS. 3-5.

Figure 3:
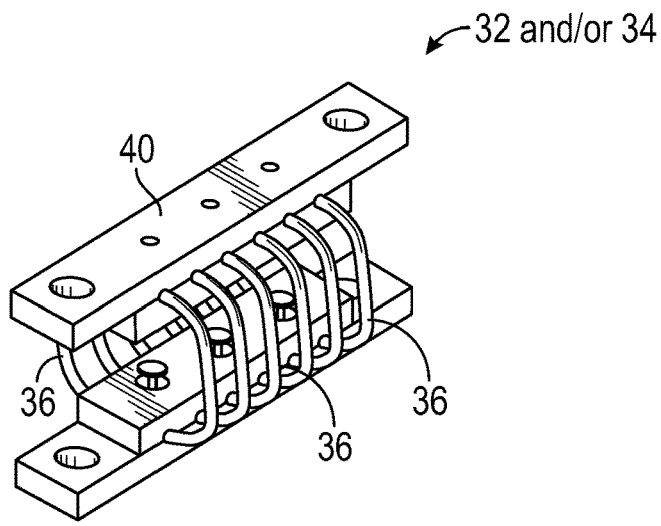
FIG. 3 illustrates a perspective view of a vibration mitigating apparatus in accordance with an exemplary embodiment.

In FIG. 3, the vibration isolator 32 and/or 34 is configured having spring elements 36 disposed between and coupled to a lower mounting plate 38 that is coupled to, for example, the airframe structure 7 and an upper mounting plate 40 that is coupled to, for example, the seat track 6. The vibration isolator 32 and/or 34 may be tuned to reduce or prevent vibrations at certain frequencies and amplitudes conducive for inducing drowsiness by selecting spring elements 36 with a spring rate(s) effective for reducing or dampening such vibrations.

Figure 4:
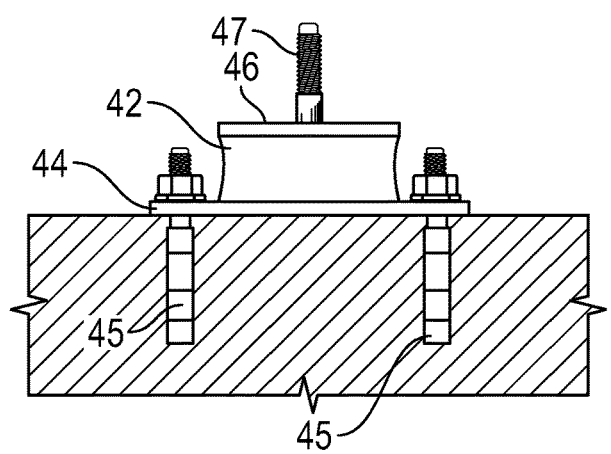
FIG. 4 illustrates a side view of a vibration mitigating apparatus in accordance with an exemplary embodiment.

In FIG. 4, the vibration isolator 32 and/or 34 is configured having an elastomeric element 42 (e.g., molded rubber piece or the like) disposed between and coupled to a lower mounting plate 44 with studs 45 that are coupled to, for example, the airframe structure 7 and an upper mounting plate 46 with a stud 47 that is coupled to, for example, the seat track 6. The vibration isolator 32 and/or 34 may be tuned to reduce or prevent vibrations at certain frequencies and amplitudes conducive for inducing drowsiness by selecting an elastomeric material having a section modulus effective for reducing or dampening such vibrations.

Figure 5:
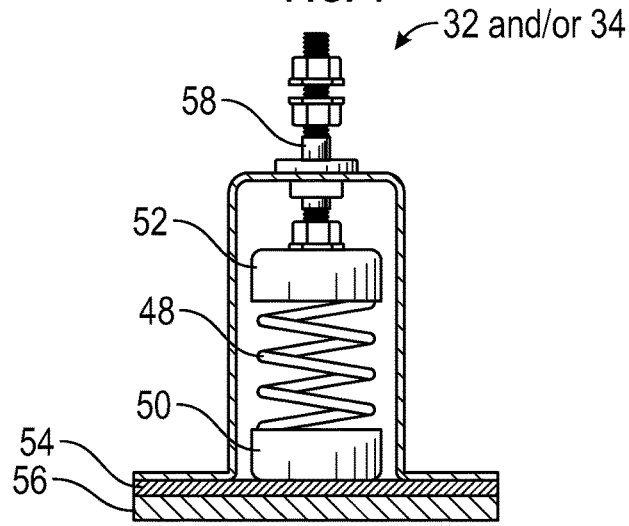
FIG. 5 illustrates a side view of a vibration mitigating apparatus in accordance with an exemplary embodiment.

In FIG. 5, the vibration isolator 32 and/or 34 is configured having a coiled spring 48 that is disposed between a lower spring cup 50 and an upper spring cup 52. The lower spring cup is supported on a base 54 that includes an elastomeric pad 56 that is coupled to, for example, the airframe structure 7. The upper spring cup is coupled to a shaft 58 that is coupled to, for example, the seat track 6. The vibration isolator 32 and/or 34 may be tuned to reduce or prevent vibrations at certain frequencies and amplitudes conducive for inducing drowsiness by selecting the coiled spring 48 with a spring rate(s) effective for reducing or dampening such vibrations.

Figure 6:
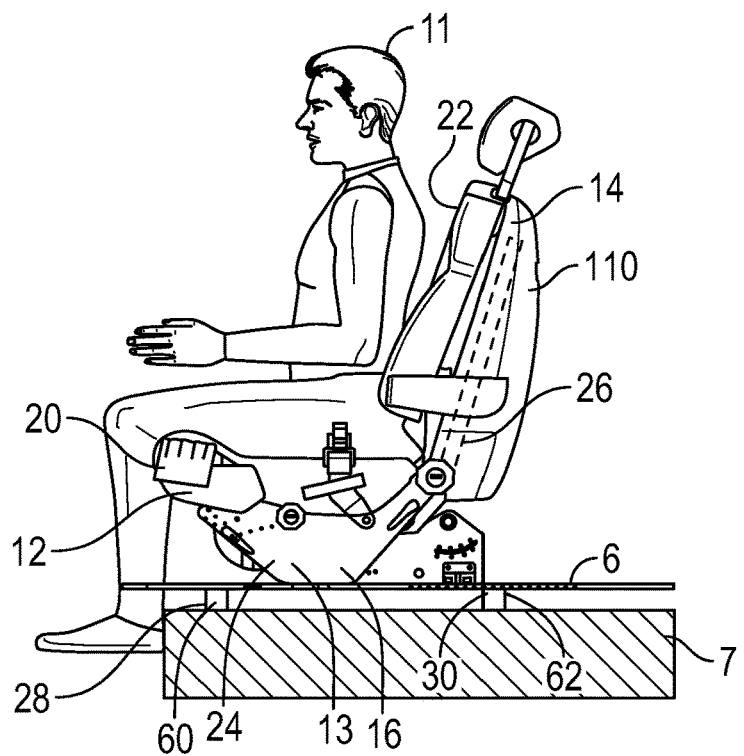
FIG. 6 illustrates a side view of an aircraft seat assembly including a vibration mitigating apparatus and a seat occupant in accordance with an exemplary embodiment.

FIG. 6 illustrates a side view of an aircraft seat assembly 110 supporting a seat occupant 11 in accordance with an exemplary embodiment. The aircraft seat assembly 110 is similarly configured to the aircraft seat assembly 10 as previously discussed in relationship to FIG. 2 including the seat base portion 12 including the seat substructure 13, the seat backrest portion 14, the seat frame 16, the seat base cushion 20, the seat backrest cushion 22, the seat base structure portion 24, and the seat backrest structure portion 26, but with the exception that the vibration mitigating apparatuses 28 and 30 are active devices. That is, the vibration mitigating apparatuses 28 and 30 are configured to actively cancel or reduce the vibrations conducive for inducing drowsiness by producing destructive interference vibrations that are at the same frequency but out of phase with the vibrations. As will be discussed in further detail below, non-limiting examples of vibration mitigating apparatuses 28 and 30 that are active devices include electromechanical actuators, hydraulic actuators, pneumatic actuators, linear actuators, audio speakers, and shaker actuators.

As illustrated, in an exemplary embodiment, the vibration mitigating apparatuses are linear actuators 60 and 62 that are disposed between and directly coupled to the seat track 6 and the airframe structure 7. The linear actuators 60 and 62 produce destructive interference vibrations that are at the same frequency but out of phase with the vibrations propagating through the airframe structure 7 to reduce or prevent the vibrations from transferring through the seat track 6 to the seat frame 16. Non-limiting examples of linear actuators are illustrated FIGS. 7-8.

Figure 7:
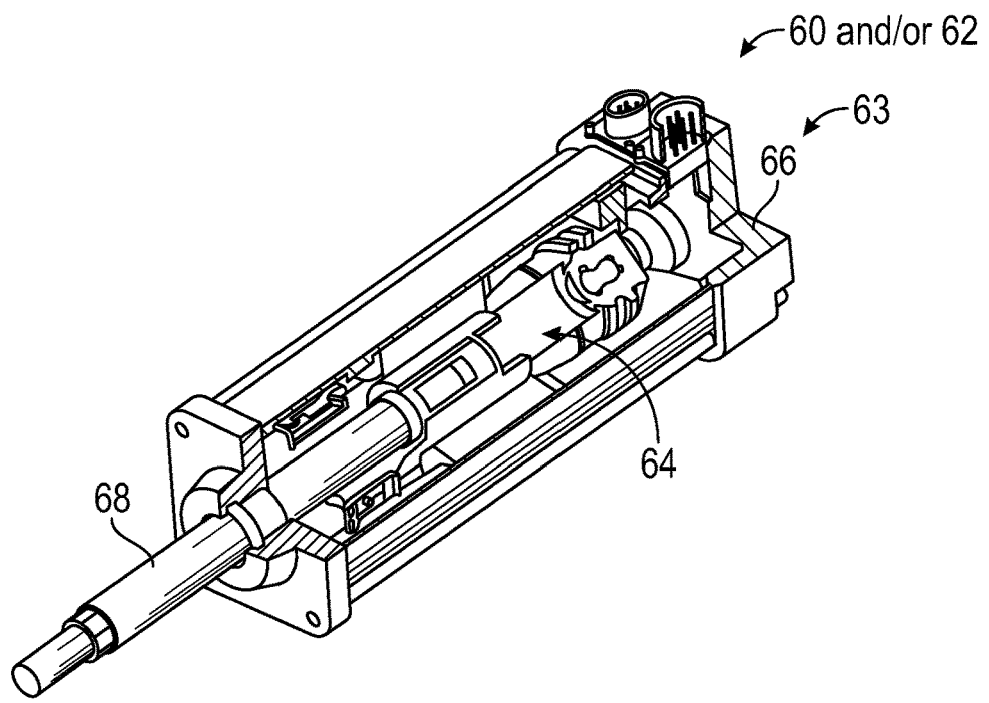
FIG. 7 illustrates a tear-away perspective view of a vibration mitigating apparatus in accordance with an exemplary embodiment.

In FIG. 7, the linear actuator 60 and/or 62 is an electromechanical actuator 63 having a ball-screw drive 64 disposed between and coupled to a base 66 that is coupled to, for example, the airframe structure 7 and a rod 68 that is coupled to, for example, the seat track 6. The linear actuator 60 and/or 62 produces relatively high rates of opposing direction, linear motion with relatively small amplitudes to produce the out of phase vibrations to cancel out the motion due to the vibrations propagating through the airframe structure 7.

Figure 8:
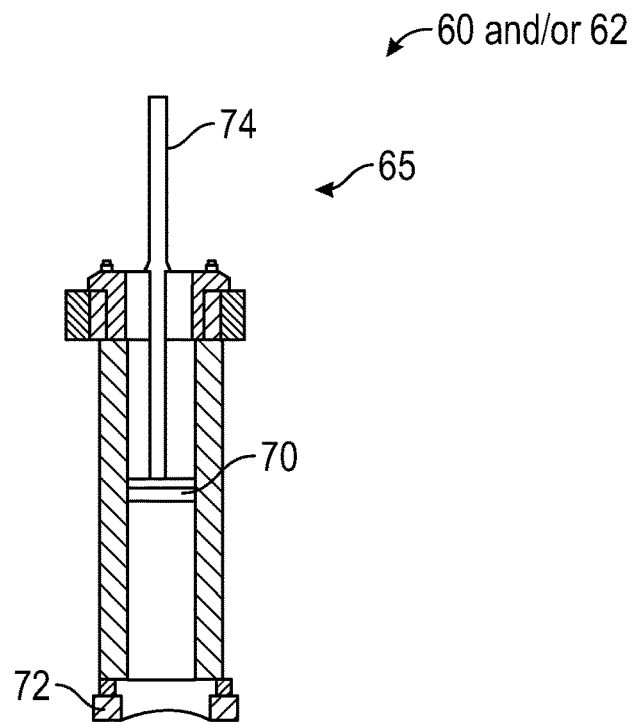
FIG. 8 illustrates a tear-away side view of a vibration mitigating apparatus in accordance with an exemplary embodiment.

In FIG. 8, the linear actuator 60 and/or 62 is hydraulic or pneumatic actuator 65 having a sliding piston 70 disposed between and coupled to a base 72 that is coupled to, for example, the airframe structure 7 and a rod 74 that is coupled to, for example, the seat track 6. The linear actuator 60 and/or 62 produces relatively high rates of opposing direction, linear motion with relatively small amplitudes to produce the out of phase vibrations to cancel out the motion due to the vibrations propagating through the airframe structure 7.

Figure 9:
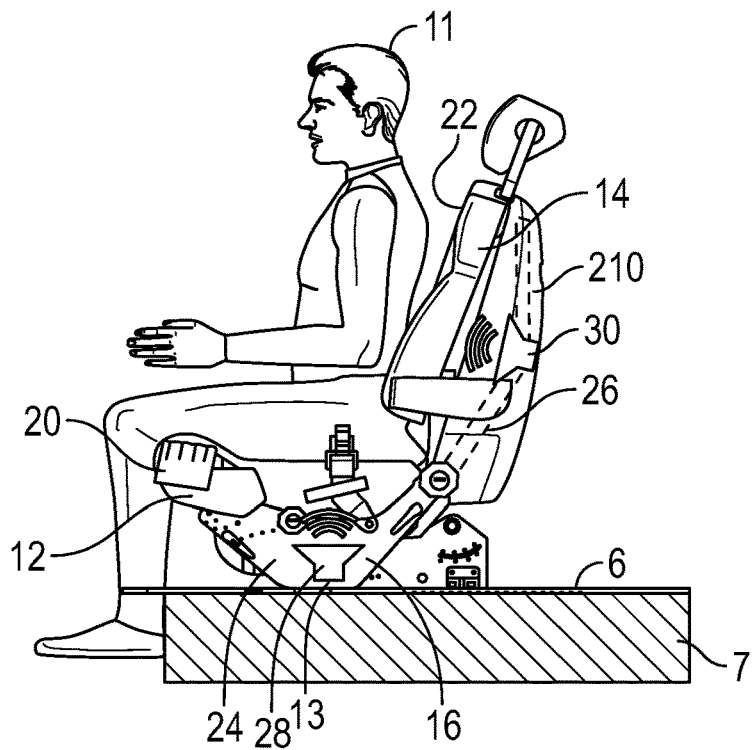
FIG. 9 illustrates a side view of an aircraft seat assembly including a vibration mitigating apparatus and a seat occupant in accordance with an exemplary embodiment.

FIG. 9 illustrates a side view of an aircraft seat assembly 210 supporting a seat occupant 11 in accordance with an exemplary embodiment. The aircraft seat assembly 210 is similarly configured to the aircraft seat assembly 110 as previously discussed in relationship to FIG. 6 including the seat base portion 12 including the seat substructure 13, the seat backrest portion 14, the seat frame 16, the seat base cushion 20, the seat backrest cushion 22, the seat base structure portion 24, and the seat backrest structure portion 26, but with the exception that the vibration mitigating apparatuses 28 and 30 are directly coupled to the seat frame 16.

In an exemplary embodiment, the vibration mitigating apparatuses 28 and 30 are active devices that are arranged adjacent to and/or within the seat frame 16 (e.g., seat structure) for reducing or preventing vibrations from transferring to the seat occupant 11. As illustrated, the vibration mitigating apparatus 28 is disposed adjacent to and/or within the seat base structure portion 24, specifically of the seat substructure 13 of the seat base portion 12, and the vibration mitigating apparatus 30 is disposed adjacent to and/or within the seat backrest structure portion 26 of the seat backrest portion 14. In an exemplary embodiment, the vibration mitigating apparatuses 28 and 30 produce destructive interference vibrations that are at the same frequency but out of phase with the vibrations propagating through the seat frame 16.

Figure 10:
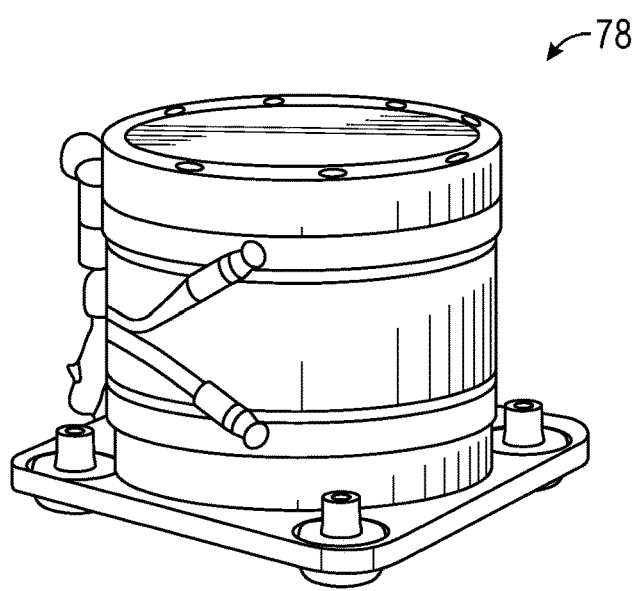
FIG. 10 illustrates a perspective view of a vibration mitigating apparatus in accordance with an exemplary embodiment.
Figure 11:
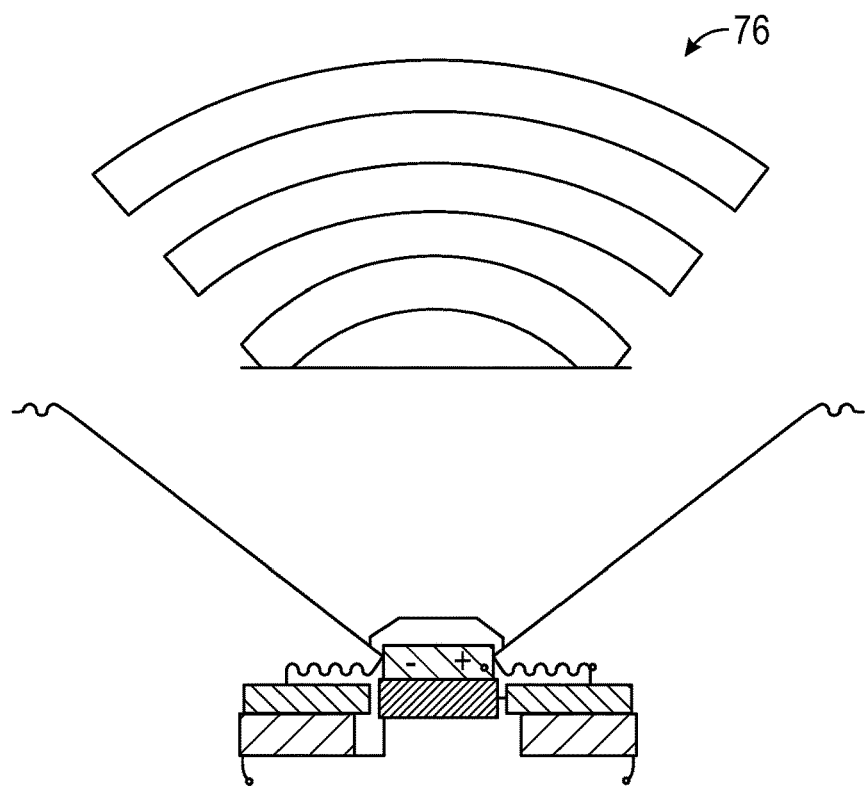
FIG. 11 illustrates a cross-sectional view of a vibration mitigating apparatus in accordance with an exemplary embodiment.

Referring also to FIGS. 10-11, the vibration mitigating apparatuses 28 and 30, independently, can be an audio speaker 76 or a shaker actuator 78. Without being limited by theory, in an exemplary embodiment, both the audio speaker 76 and the shaker actuator 78 function in similar ways, using a magnet(s) and coils to produce a small displacement at a controlled frequency. The audio speaker 76 imparts the vibration energy to air within the aircraft seat assembly 10 to produce sound while the shaker actuator 78 has an internal "stinger" (e.g., a rod that impacts a membrane, for example like a drum head, to produce vibrations) that acts like a small battering ram to transfer energy into the aircraft seat assembly 10. Both the audio speaker 76 and the shaker actuator 78 are configured to produce destructive interference vibrations that are out of phase with the vibrations propagating through the seat frame 16.

Figure 12:
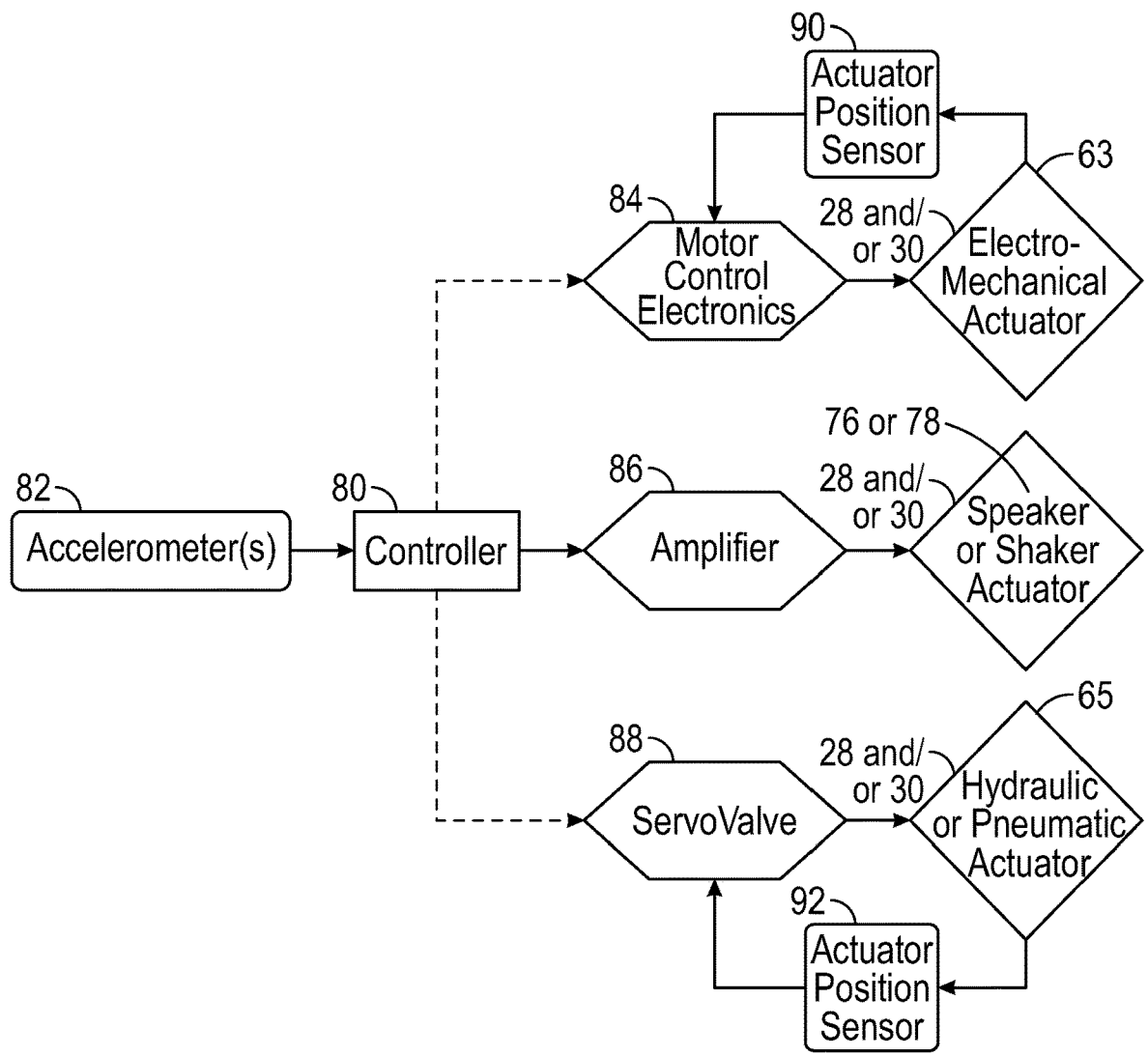
FIG. 12 illustrates a schematic representation of a vibration mitigating apparatus in accordance with an exemplary embodiment.

Referring to FIG. 12, a schematic representation of the vibration mitigating apparatuses 28 and/or 30 in communication with a controller 80, a vibration sensor 82, motor control electronics 84, and an amplifier 86, servo valve 88, and actuator position sensors 90 and 92 is provided. In an exemplary embodiment, the controller 80 receives an input signal from the vibration sensor 82 (e.g., accelerometer or the like). In one example, the vibration sensor 82 is disposed proximate the seat structure (e.g., near or coupled to airframe structure 7, seat track 6, or seat frame 16) and is configured to detect vibrations conducive for inducing drowsiness and to produce the input signal including a frequency and amplitude of these vibrations.

The controller 80 generates a command signal in response to the input signal for instructing the vibration mitigating apparatus 28 and/or 30 to produce the destructive interference vibrations as discussed above. In one example and as illustrated, the vibration mitigating apparatus 28 or 30 is an electromechanical actuator 63 and the command signal is communicated to the motor control electronics 84. In an exemplary embodiment, the controller 80 is commanding the actuator and the actuator position sensor 90 is used to provide feedback to let the motor controller know that the commanded position has been reached and to stop moving the actuator. The motor control electronics 84 produces a motor voltage in response to the command signal and the motor voltage is communicated to the electromechanical actuator 63 for producing the destructive interference vibrations.

In another example and as illustrated, the vibration mitigating apparatus 28 or 30 is an audio speaker 76 or a shaker actuator 78 and the command signal is communicated to the amplifier 86. The amplifier 86 produces a voltage and current in response to the command signal and the voltage and current are communicated to the audio speaker 76 or the shaker actuator 78 for producing the destructive interference vibrations.

In another example and as illustrated, the vibration mitigating apparatus 28 or 30 is a hydraulic or pneumatic actuator 65 and the command signal is communicated to the servo valve 88. In an exemplary embodiment, the actuator position sensor 92 functions similarly to the actuator position sensor 90 providing a closed loop feedback which allows the controller to know when the commanded position has been reached. The servo valve 88 produces fluid pressure and fluid flow in response to the command signal and the fluid pressure and fluid flow are communicated to the hydraulic or pneumatic actuator 65 for producing the destructive interference vibrations.

Figure 13:
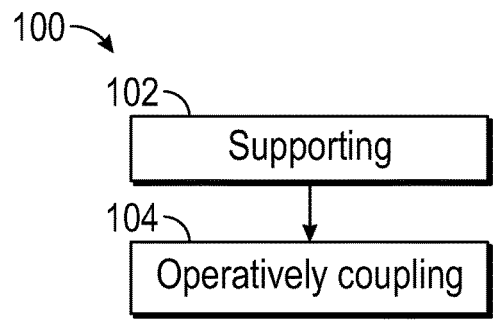
FIG. 13 illustrates a method for fabricating an aircraft seat assembly in accordance with an exemplary embodiment.

Referring to FIG. 13, a method 100 for fabricating an aircraft seat assembly for supporting a seat occupant is provided. The method 100 includes, at step 102, supporting a seat cushion with a seat structure. With continuing reference to FIGS. 1-12, in an embodiment, the seat structure may comprise seat frame 16 discussed above. At step 104, a vibration mitigating apparatus is operatively coupled to the seat structure to reduce or prevent vibrations conducive for inducing drowsiness from transferring to the seat occupant. In some embodiments, the vibration mitigating apparatus may comprise vibration mitigating apparatuses 28 and/or 30, discussed above.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An aircraft seat assembly for supporting a seat occupant, the aircraft seat assembly comprising:
    a seat structure;
    a seat cushion supported by the seat structure; and
    a vibration mitigating apparatus operatively coupled to the seat structure to one of reduce and prevent vibrations from transferring to the seat occupant, wherein the vibration mitigating apparatus is configured to one of actively cancel or reduce the vibrations by producing destructive interference vibrations that are out of phase with the vibrations, and wherein the aircraft seat assembly further comprises a controller that is in communication with the vibration mitigating apparatus and that is configured to receive an input signal and to generate a command signal in response to the input signal for instructing the vibration mitigating apparatus to produce the destructive interference vibrations.

2. The aircraft seat assembly of claim 1, wherein the vibrations are at a frequency of from about 1 to about 15 Hz.

3. The aircraft seat assembly of claim 1, wherein the vibrations have an amplitude of from about 0.005 inches to about 1 inch.

4. The aircraft seat assembly of claim 1, wherein the vibration mitigating apparatus is selected from an electromechanical actuator, a hydraulic actuator, a pneumatic actuator, a linear actuator, an audio speaker, and a shaker actuator.

5. The aircraft seat assembly of claim 1, wherein the vibration mitigating apparatus is directly coupled to the seat structure.

6. The aircraft seat assembly of claim 1, wherein the vibration mitigating apparatus is indirectly coupled to the seat structure.

7. The aircraft seat assembly of claim 6, further comprising a seat track that supports the seat structure, and wherein the vibration mitigating apparatus is directly coupled to the seat track.

8. The aircraft seat assembly of claim 7, wherein the vibration mitigating apparatus is a linear actuator that is configured to produce the destructive interference vibrations.

9. The aircraft seat assembly of claim 1, wherein the vibration mitigating apparatus is selected from an electromechanical actuator, a hydraulic actuator, a pneumatic actuator, a linear actuator, an audio speaker, and a shaker actuator.

10. The aircraft seat assembly of claim 1, further comprising a vibration sensor disposed proximate the seat structure and configured to detect the vibrations and to produce the input signal including a frequency and amplitude of the vibrations, and wherein the controller is in communication with the vibration sensor to receive the input signal.

11. An aircraft seat assembly for supporting a seat occupant, the aircraft seat assembly comprising:
    a seat base portion including a seat base structure portion and a seat base cushion supported by the seat base structure portion;
    a seat backrest portion coupled to the seat base portion and configured to extend substantially upright from the seat base portion, wherein the seat backrest portion includes a seat backrest structure portion and a seat backrest cushion supported by the seat backrest structure portion; and
    a vibration mitigating apparatus operatively coupled to one of the seat base structure portion and the seat backrest structure portion to one of reduce and prevent vibrations from transferring to the seat occupant, wherein the vibration mitigating apparatus is a first vibration mitigating apparatus configured to reduce the vibrations, and the aircraft seat assembly further comprises a second vibration mitigating apparatus configured to further reduce the vibrations, and wherein the second vibration mitigating apparatus is operatively coupled to one of the seat base structure portion and the seat backrest structure portion.

12. The aircraft seat assembly of claim 11, wherein the first vibration mitigating apparatus is disposed one of adjacent to and within the seat base structure portion.

13. The aircraft seat assembly of claim 11, wherein the first vibration mitigating apparatus is disposed one of adjacent to and within the seat backrest structure portion.

14. The aircraft seat assembly of claim 11, wherein the first vibration mitigating apparatus is disposed one of adjacent to and within the seat base structure portion and the second vibration mitigating apparatus is disposed one of adjacent to and within the seat backrest structure portion.

15. The aircraft seat assembly of claim 11, further comprising a controller in communication with the first and second vibration mitigating apparatuses and configured to receive an input signal and to generate a first command signal and a second command signal in response to the input signal, wherein the first command signal instructs the first vibration mitigating apparatus to produce a first plurality of destructive interference vibrations that are out of phase with the vibrations and the second command signal instructs the second vibration mitigating apparatus to produce a second plurality of destructive interference vibrations that are out of phase with the vibrations.

\* \* \* \* \*